US009455868B2

United States Patent
Xu et al.

(10) Patent No.: US 9,455,868 B2
(45) Date of Patent: Sep. 27, 2016

(54) FORMATION OF GUILDS IN A CLOUD COMPUTING ENVIRONMENT

(71) Applicant: Empire Technology Development LLC, Wilmington, DE (US)

(72) Inventors: Shijie Xu, Beijing (CN); Qi Li, Beijing (CN); Xuefeng Song, Hebei (CN)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 75 days.

(21) Appl. No.: 14/365,324

(22) PCT Filed: Jul. 1, 2013

(86) PCT No.: PCT/CN2013/078578
§ 371 (c)(1),
(2) Date: Jun. 13, 2014

(87) PCT Pub. No.: WO2015/000107
PCT Pub. Date: Jan. 8, 2015

(65) Prior Publication Data
US 2015/0304168 A1  Oct. 22, 2015

(51) Int. Cl.
*G06F 15/173* (2006.01)
*H04L 12/24* (2006.01)
*H04L 12/715* (2013.01)
*H04L 29/08* (2006.01)
*H04L 12/26* (2006.01)
*H04L 12/911* (2013.01)
*G06F 9/50* (2006.01)

(52) U.S. Cl.
CPC ......... *H04L 41/0816* (2013.01); *G06F 9/5061* (2013.01); *H04L 12/244* (2013.01); *H04L 41/0893* (2013.01); *H04L 43/065* (2013.01); *H04L 45/46* (2013.01); *H04L 47/70* (2013.01); *H04L 67/1008* (2013.01); *H04L 67/1097* (2013.01); *G06F 2209/5011* (2013.01)

(58) Field of Classification Search
CPC .. H04L 45/46; H04L 41/0893; H04L 12/244
See application file for complete search history.

(56) References Cited

U.S. PATENT DOCUMENTS 6,871,222 B1 * 3/2005 Frank ................. H04L 67/1097
707/E17.01
7,949,737 B2 * 5/2011 Tan ..................... H04L 12/2602
709/223

(Continued)

FOREIGN PATENT DOCUMENTS

CN    102394903 A    3/2012
CN    102801750 A    11/2012

OTHER PUBLICATIONS

Agarwal, S. and Lorch, J.R., "Matchmaking for online games and other latency-sensitive P2P systems," ACM SIGCOMM Computer Communication Review, vol. 39 Issue 4, pp. 315-326 (2009).

(Continued)

*Primary Examiner* — Patrice Winder
*Assistant Examiner* — Nam Tran
(74) *Attorney, Agent, or Firm* — Brundidge & Stanger, P.C.

(57) ABSTRACT

In a cloud computing environment, a server application hosted by a server may form a plurality of guilds by clustering multiple network terminals of similar performance together. The server application may then allocate computing resources to the guilds accordingly.

23 Claims, 5 Drawing Sheets

(56) References Cited

U.S. PATENT DOCUMENTS

| | | | |
|---|---|---|---|
| 8,029,352 B2 | 10/2011 | Lind et al. | |
| 2005/0289401 A1* | 12/2005 | Goin | G06F 11/0709 714/47.3 |
| 2006/0259274 A1* | 11/2006 | Greco | G06F 11/3409 702/182 |
| 2008/0253286 A1* | 10/2008 | Shriram | H04L 45/46 370/232 |
| 2009/0144800 A1* | 6/2009 | Black-Ziegelbein | H04L 63/104 726/1 |
| 2012/0303618 A1* | 11/2012 | Dutta | H04L 67/1097 707/737 |
| 2013/0097276 A1 | 4/2013 | Sridhar | |
| 2013/0212279 A1* | 8/2013 | Dutta | G06F 9/5077 709/226 |

OTHER PUBLICATIONS

Carlini, E. et al. "Integration of P2P and Clouds to support Massively Multiuser Virtual Environments," 9th Annual Workshop on Network and Systems Support for Games (NetGames), pp. 1-6 (2010).

Driel, M. et al., "A Survey on MMOG System Architectures," pp. 1-19 (Mar. 30, 2011).

International Search Report and Written Opinion for International Application No. PCT/CN/2013/078578, mailed on Apr. 10, 2014.

* cited by examiner

FORMATION OF GUILDS IN A CLOUD COMPUTING ENVIRONMENT

CROSS-REFERENCE TO RELATED APPLICATION

The present application is a U.S. national stage filing under 35 U.S.C. §371 of International Application No. PCT/CN2013/078578, filed on Jul. 1, 2013.

TECHNICAL FIELD

The technologies described herein pertain generally to the formation of one or more guilds in a cloud computing environment.

BACKGROUND

Unless otherwise indicated herein, the approaches described in this section are not prior art to the claims in this application and are not admitted to be prior art by inclusion in this section.

In a cloud computing environment, a server may be connected to multiple network terminals, each of which may or may not have similar performance capabilities. To more efficiently utilize computing resources, network terminals that have substantially similar performance capabilities may be grouped together to form one or more guilds. Each of the one or more guilds may be allocated with portions of computing resources of the server.

SUMMARY

Technologies are generally described for the formation of one or more guilds in a cloud computing environment. The various techniques may be implemented in various systems, methods, and/or computer-readable mediums.

In some examples, various techniques may be implemented as methods. Some methods may include generating, for each of a plurality of network terminals, a performance vector that indicates a computational capability of a corresponding one of the plurality of network terminals; forming a plurality of guilds by, for each of the guilds, clustering two or more of the plurality of network terminals, for which the respective performance vectors are within a predetermined threshold value range of each other; and allocating at least one of the plurality of guilds to a cloud server that provides executable contents to the plurality of network terminals.

In some examples, various techniques may be implemented as systems. Some systems may include a cloud server that is configured to provide executable contents to multiple network terminals, each of which is assigned a performance vector to indicate a corresponding computational capability. The systems may further include one or more guilds, communicatively coupled to the cloud server, each including two or more of the multiple network terminals, for which the respective performance vectors are within a predetermined threshold value range of each other.

In some examples, various techniques may be implemented as executable instructions stored on one or more computer-readable mediums that, when executed, may cause one or more processors to perform operations including assigning each of a plurality of network terminals with a performance vector that indicates a computational capability of a corresponding network terminal; forming a plurality of guilds by, for each of the guilds, clustering two or more of the plurality of network terminals based on the performance vectors of the two or more of the plurality of network terminals; adding a new network terminal to one of a plurality of existing guilds; and allocating at least one of the plurality of guilds to a cloud server configured to provide executable contents to the plurality of network terminals.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
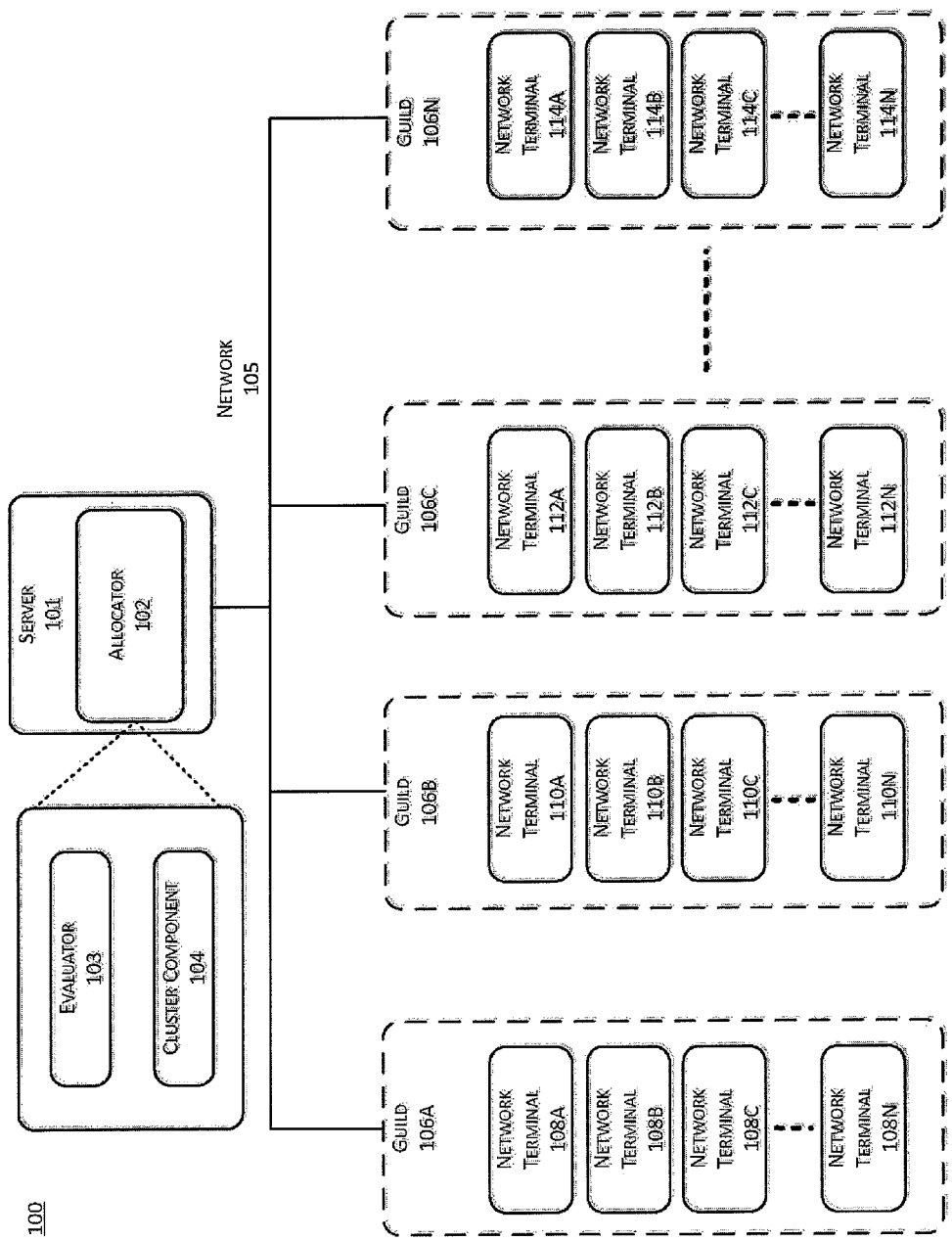
FIG. 1 shows an example cloud computing system in which the formation of guilds in a cloud computing environment may be implemented.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example cloud computing system 100 in which the formation of guilds in a cloud computing environment may be implemented, arranged in accordance with at least some embodiments described herein. As depicted, example cloud computing system 100 may include, at least, a server 101; an allocator 102, an instance of which may be hosted on server 101; an evaluator 103 and a cluster component 104, which may be implemented in allocator 102;

and one or more guilds 106A-106N that may be communicatively coupled to server 101 via a network 105. Each of the one or more guilds 106A-106N may include a multiple number of network terminals, e.g., network terminals 108A-108N. Unless context requires specific reference to a particular one or more of guilds 106A, 106B, 106C, . . . 106N, reference may be made collectively to "guilds 106," as used herein. Similarly, reference may be made collectively to "network terminals 108," "network terminals 110," "network terminals 112," and "network terminals 114," each of which will be described more fully below.

Server 101 may refer to a computer hardware system that is configured to execute one or more hosted computing services, e.g., allocator 102, to execute one or more computing tasks that may be received from one or more other computers, i.e., network terminals 108-114, on network 105, or to feed executable contents to one or more of the other computers.

Operating systems, such as Microsoft Windows®, Linux, OS X, etc., may be executed on server 101 to allow a variety of software programs to be executed on or by one or more of the hardware components (not shown) of server 101. Server 101, in some examples, may include one or more hardware components that include Central Processing Units (CPU), physical storage space, memories, network ports, network interface controller, etc. In some examples, the aforementioned executable contents may be portions of one or more software programs of one or more massive multiplayer online (MMO) games.

Allocator 102 may refer to a software program, or application, hosted on server 101 that may be configured to evaluate the performance of the network terminals that are communicatively coupled to server 101 based on hardware configuration information of each of the network terminals, to form guilds 106 by clustering two or more network terminals of similar performance, and, further, to allocate guilds 106 to server 101. The hardware configuration information may be submitted by the network terminals to server 101. Alternatively, allocator 102 may allocate one or more of guilds 106 to at least one other server (not shown) if allocator 102 determines that server 101 does not have sufficient computing resources to host the aforementioned one or more of guilds 106. None of the guilds may be allocated to more than one server.

As referenced herein, "allocate" may refer to allocator 102, having established a communication connection to each of guilds 106, configuring server 101 to execute the one or more computing tasks for guilds 106 and feeding executable contents to guilds 106.

Evaluator 103 may refer to a software component or module, included in allocator 102, which may be configured to evaluate the performance of each of network terminals 108, 110, 112, and 114, which are further described below; and to generate a resulting performance vector in the form of $(p_1, p_2, p_3, \ldots, p_i)$. Each element of the performance vector may represent a performance parameter of a corresponding hardware component of each of network terminals 108, 110, 112, and 114. For example, $p_1$ may represent the CPU speed, $p_2$ may represent the memory speed, and $p_3$ may represent the number of cores included in the CPU. Further, evaluator 103 may normalize the performance vectors of network terminals 108, 110, 112, and 114, i.e., convert the performance vectors into a predetermined numeric range, e.g., from 0 to 1.

Cluster component 104 may refer to a software component or module that may be configured to cluster two or more of network terminals 108, 110, 112, and 114 based on the performance vectors. That is, the two or more network terminals, e.g., network terminals 108, may be clustered if the performance vectors thereof are within a predetermined threshold value range of each other. "Value range" as referenced herein may refer to the distance between two vectors. For example, the distance $(d_{(p,q)})$ between performance vectors $P(p_1, p_2, \ldots, p_n)$ and $Q(q_1, q_2, \ldots, q_n)$ may be determined using the following formula:

$$d_{(p,q)} = \sqrt{(p_1-q_1)^2 + (p_2-q_2)^2 + \ldots + (p_i-q_i)^2 + \ldots + (p_n-q_n)^2}.$$

Network 105 may refer to one or more communication links that follow at least one of various communication protocols, including but not limited to mobile communication technologies, e.g., GSM, CDMA, etc. Particular wireless service providers of network 105 may decide which one of the mobile communication technologies to adopt. The one or more communication links may be implemented utilizing non-cellular technologies such as conventional analog AM or FM radio, Wi-Fi™, wireless local area network (WLAN or IEEE 802.11), WIMAX™ (Worldwide Interoperability for Microwave Access), Bluetooth™, hard-wired connections, e.g., cable, phone lines, and other analog and digital wireless voice and data transmission technologies.

Each of guilds 106 may refer to a group of network terminals, e.g., network terminal 108, which are clustered by allocator 102. As referenced herein, a "guild" may refer to an abstract group of one or more network terminals. Network terminals that are compiled in a respective one of guilds 106 may have or include similar hardware components and, thus, possess similar computational capabilities. As a result, allocator 102 may be configured to utilize similar portions of computing resources of server 101 to serve, e.g., execute, the computing tasks from each of the network terminals of a guild and/or to provide similar portions of executable contents to each of the network terminals of the guild. For example, as shown in FIG. 1, guild 106A includes network terminals 108A, 108B, 108C, . . . 108N, each of which may have similar hardware configurations, including similar hardware components of each network terminal. Thus, network terminals 108A, 108B, 108C, . . . , 108N may possess similar computational capabilities, relative to each other. Accordingly, allocator 102 may calculate an average computational capability for each of guilds 106 and may further allocate portions of computing resources of server 101 to each of guilds 106 based on the calculated average computational capabilities. In accordance with further examples, with respect to network terminals 108A, 108B, 108C, . . . , 108N within a same guild, e.g., guild 106A, allocator 102 may be configured to allocate similar number of CPU cores and/or similar portions of physical memories to the computing tasks from each of the network terminals. In addition, allocator 102 may be configured to provide a similar amount of computing tasks to each of the aforementioned network terminals, e.g., reconstructing a 3-D model with similar details.

As referenced herein, "computational capability" may refer to the speed for a computer to perform a certain computing task. The computational capability may be affected by CPU speed, memory speed, bus bandwidth, etc.

Network terminals 108, 110, 112, and 114 may refer to two or more physical computers, or computing devices, communicatively coupled to server 101 via network 105. Network terminals 108A, 108B, 108C, . . . , 108N may be grouped together to form guild 106A; network terminals 110A, 110B, 110C, . . . , 110N may be grouped together to form guild 106B; network terminals 112A, 112B, 112C, . . . , 112N may be grouped together to form guild 106C; and network terminal 114A, 114B, 114C, . . . , 114N may be grouped together to form guild 106N. Each of network terminals 108, 110, 112, and 114 may include multiple hardware components that include CPU, physical storage space, memories, network ports, etc. In some examples, at least one of network terminals 108, 110, 112, and 114 may refer to a wireless communication device, e.g., cellphone, tablet, laptop, etc. In accordance with some examples, allocator 102 may be configured to evaluate each hardware component and generate one or more evaluation results corresponding to the multiple hardware components based on the hardware configuration information submitted from network terminals 108, 110, 112, and 114 to server 101. Further, allocator 102 may generate a performance vector for each of network terminals 108, 110, 112, and 114 based on the one or more evaluation results. Each performance vector may indicate an overall computational capability of a corresponding network terminal.

Thus, FIG. 1 shows an example cloud computing system 100 that includes a cloud server configured to provide executable contents to multiple network terminals, each of which is assigned a performance vector to indicate a corresponding computational capability, and one or more guilds, communicatively coupled to the cloud server, each including two or more of the multiple network terminals, for which the respective performance vectors are within a predetermined threshold value range of each other.

Figure 2:
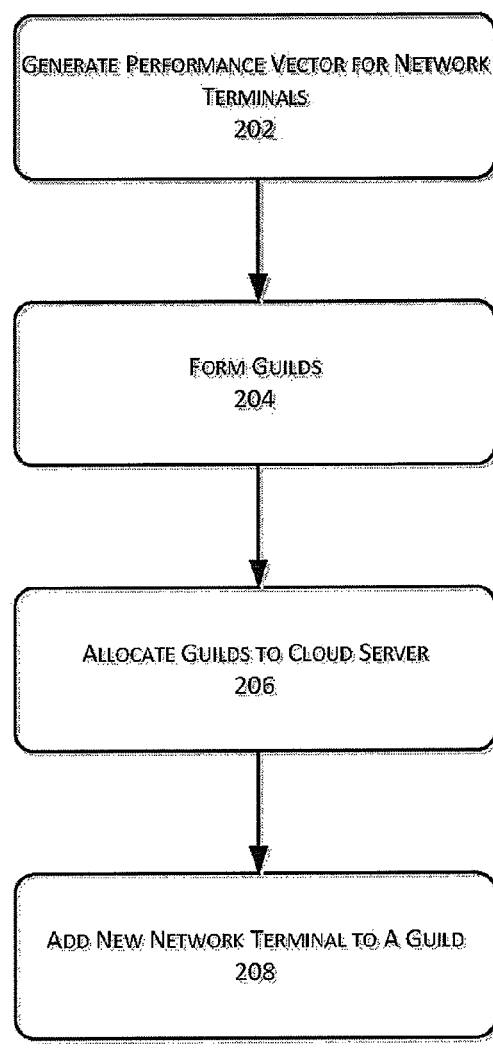
FIG. 2 shows an example configuration of a processing flow of operations by which the formation of guilds in a cloud computing environment may be implemented.

FIG. 2 shows an example configuration of a processing flow 200 of operations by which the formation of guilds in a cloud computing environment may be implemented, arranged in accordance with at least some embodiments described herein. As depicted, processing flow 200 may include sub-processes executed by various components that are part of example cloud computing system 100. However, processing flow 200 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 200 may include various operations, functions, or actions as illustrated by one or more of blocks 202, 204, 206, and 208. Processing flow 200 may begin at block 202.

Block 202 (Generate Performance Vector for Network Terminals) may refer to evaluator 103 generating, for each of network terminals 108, 110, 112, and 114, a performance vector that may indicate a computational capability of a corresponding network terminal. Each element of the performance vector may represent one performance parameter of a hardware component of one of network terminals 108, 110, 112, and 114. Non-limiting examples of such performance parameters may include CPU speed, memory speed, or a number of cores included in a corresponding CPU. The respective performance vectors of network terminals 108, 110, 112, and 114, may be normalized i.e., converted into a predetermined numeric range, e.g., from 0 to 1. Processing flow 200 may continue from block 202 to 204.

Block 204 (Form Guilds) may refer to cluster component 104 forming guilds 106 by, for each of guilds 106, clustering two or more of network terminals 108, 110, 112, and 114 based on the performance vectors thereof. That is, the two or more network terminals, e.g., network terminals 108, may be clustered if the performance vectors thereof are within a predetermined threshold value range of each other.

In accordance with some examples, evaluator 103 may evaluate network terminals 108A and 108B and generate two performance vectors, e.g., P and Q respectively for network terminals 108A and 108B. The threshold value range may be predetermined as D. Cluster component 104 may cluster network terminal 108B with network terminal 108A, to form guild 106A, if the distance between performance vector P and performance vector Q is not greater than D. Similarly, cluster component 104 may not cluster network terminal 108B with network terminal 108A if the distance between performance vector P and performance vector Q is greater than D. In accordance with some examples, each of guilds 106 may be assigned with a predetermined limit that the number of network terminals within each of guilds 106 may not exceed. The predetermined threshold value range and the predetermined limit may be provided and dynamically modified by a game provider of an MMO game. Processing flow 200 may continue from block 204 to 206.

Block 206 (Allocate Guilds to Cloud Server) may refer to allocator 102 allocating at least one of guilds 106 to a cloud server, e.g., server 101, if the cloud server has sufficient computing resources to host the at least one of guilds 106. To determine whether server 101 has sufficient computing resources, guilds 106 may each provide a computing resource expectation vector that indicates the computing resources required for the network terminals within each of guilds 106, e.g., network terminals 108 within guild 106A, to complete computing tasks. For example, the computing resource expectation vector may be in the form of ($e_1$, $e_2$, $e_3$ . . . , $e_n$). Each element of the computing resource expectation vector may represent a usage expectation of a hardware component of server 101 if the one of guilds 106 is allocated to server 101. Evaluator 103 may assess the computational capability of server 101 and accordingly generate a current computational capability vector that may indicate a maximum number of additional network terminals that may be allocated to server 101. In accordance with some examples, allocator 102 may allocate one or more of guilds 106 to server 101 if the sum of the computing resource expectation vectors of the one or more of guilds is less than the current computational capability vector of server 101. In accordance with some other examples, allocator 102 may allocate one of guilds 106 to server 101 if the predetermined limit of the one of guilds 106 is less than the maximum number indicated by the current computational capability vector of server 101. Processing flow 200 may continue from block 206 to 208.

Block 208 (Add New Network Terminal to a Guild) may refer to allocator 102 adding a new network terminal to one of guilds 106. In accordance with some examples, evaluator 103 may be configured to evaluate the new network terminal and to establish a new performance vector for the new network terminal. Evaluator 103 may also be configured to establish a guild performance vector for guilds 106. Each guild performance vector may represent the average value of the performance vectors of network terminals within each guild, e.g., network terminals 108. Evaluator 103 may then calculate the value range, i.e., distance, between the new performance vector and each guild performance vector. Guilds 106 may then be sorted in a queue, based on the calculated value ranges to the new performance vector, in ascending order. The new network terminal may be added to the first guild in the queue provided that the value range thereof is less than the predetermined threshold value range of the first guild in the queue.

Thus, FIG. 2 shows an example configuration of a processing flow 200 of operations that include generating, for each of network terminals 108, 110, 112, and 114, a performance vector that indicates a computational capability of a corresponding one of network terminals 108, 110, 112, and 114; forming guilds 106 by, for each of guilds 106, clustering two or more of network terminals 108, 110, 112, and 114, for which the respective performance vectors are within a predetermined threshold value range of each other; and allocating at least one of guilds 106 to server 101 that provides executable contents to network terminals 108, 110, 112, and 114.

Figure 3:
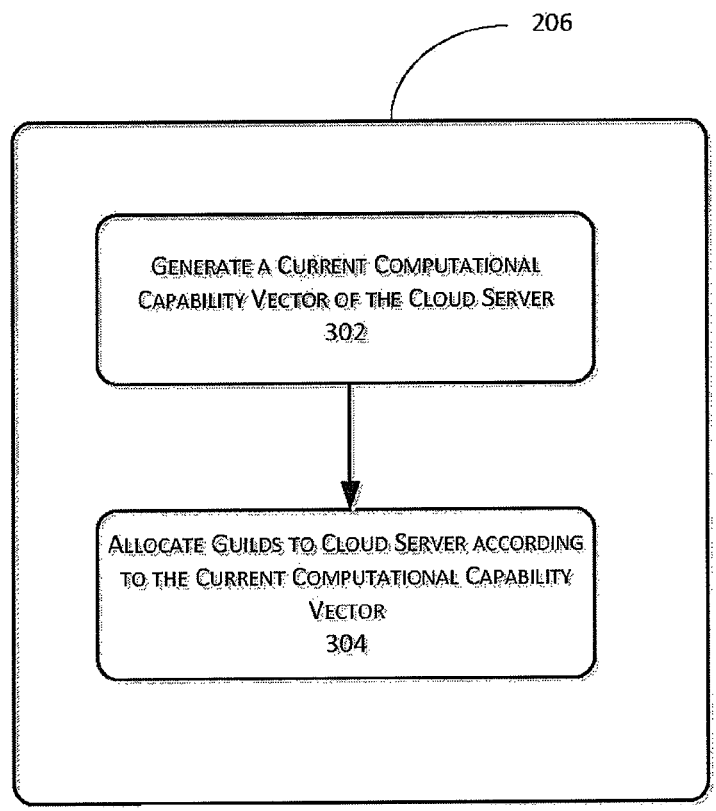
FIG. 3 shows an example configuration of a sub-processing flow of operations by which the formation of guilds in a cloud computing environment may be implemented.

FIG. 3 shows an example configuration of a sub-processing flow 300 of operations by which formation of guilds in a cloud computing environment may be implemented, arranged in accordance with at least some embodiments described herein. As depicted, sub-processing flow 300 may be included in block 206 (Allocate Guilds to Cloud Server) described above with reference to FIG. 2. Further, sub-processing flow 300 may include sub-processes executed by various components that are part of example cloud computing system 100. However, sub-processing flow 300 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Sub-processing flow 300 may include various operations, functions, or actions as illustrated by one or more of blocks 302 and 304. Sub-processing flow 300 may begin at block 302.

Block 302 (Generate a Current Computational Capability Vector of the Cloud Server) may refer to allocator 102 assessing the computational capability of a cloud server, e.g., server 101, and generating, based on the assessment, a current computational capability vector of server 101. The current computational capability vector may indicate a maximum number of further network terminals that are allocable to server 101. Similar to the performance vectors of network terminals 108, 110, 112, and 114, the current computational capability vector may be generated in the form of $(c_1, c_2, c_3, \ldots, c_n)$. Each element of the current computational capability vector may represent available computational capability of a hardware component of server 101. For example, $c_1$ may represent the unused portion of CPU capability, $c_2$ may represent the unused portion of physical memory, $c_3$ may represent the unused portion of bandwidth, etc. Sub-processing flow 300 may continue from block 302 to 304.

Block 304 (Allocate Guilds to Cloud Server according to the Current Computational Capability Vector) may refer to allocator 102 allocating at least one of guilds 106 to server 101. In accordance with some examples, allocator 102 may be configured to allocate one of guilds 106 to server 101 when the aforementioned predetermined limit of the one of guilds 106 is less than the maximum number indicated by the current computational capability vector. One or more of guilds 106 may each provide, to allocator 102, a computing resource expectation vector that indicates the computing resources required for the network terminals within each of guilds 106 to complete computing tasks. For example, the computing resource expectation vector may be in the form of $(e_1, e_2, \ldots, e_i)$. Each element of the computing resource expectation vector may represent a usage expectation of a hardware component of server 101 if a corresponding one of guilds 106 is allocated to server 101. Allocator 102 may be configured to then allocate the one or more of guilds 106 to server 101 if the sum of the computing resource expectation vectors of the one or more of guilds is less than the current computational capability vector of server 101.

Thus, FIG. 3 shows an example configuration of a sub-processing flow 300 of operations that include generating a current computational capability vector of server 101 that indicates a maximum number of further network terminals that are allocable to server 101, and allocating one of guilds 106 to server 101 when the predetermined limit of the one of guilds 106 is less than the maximum number included in the current computation capability vector of server 101.

Figure 4:
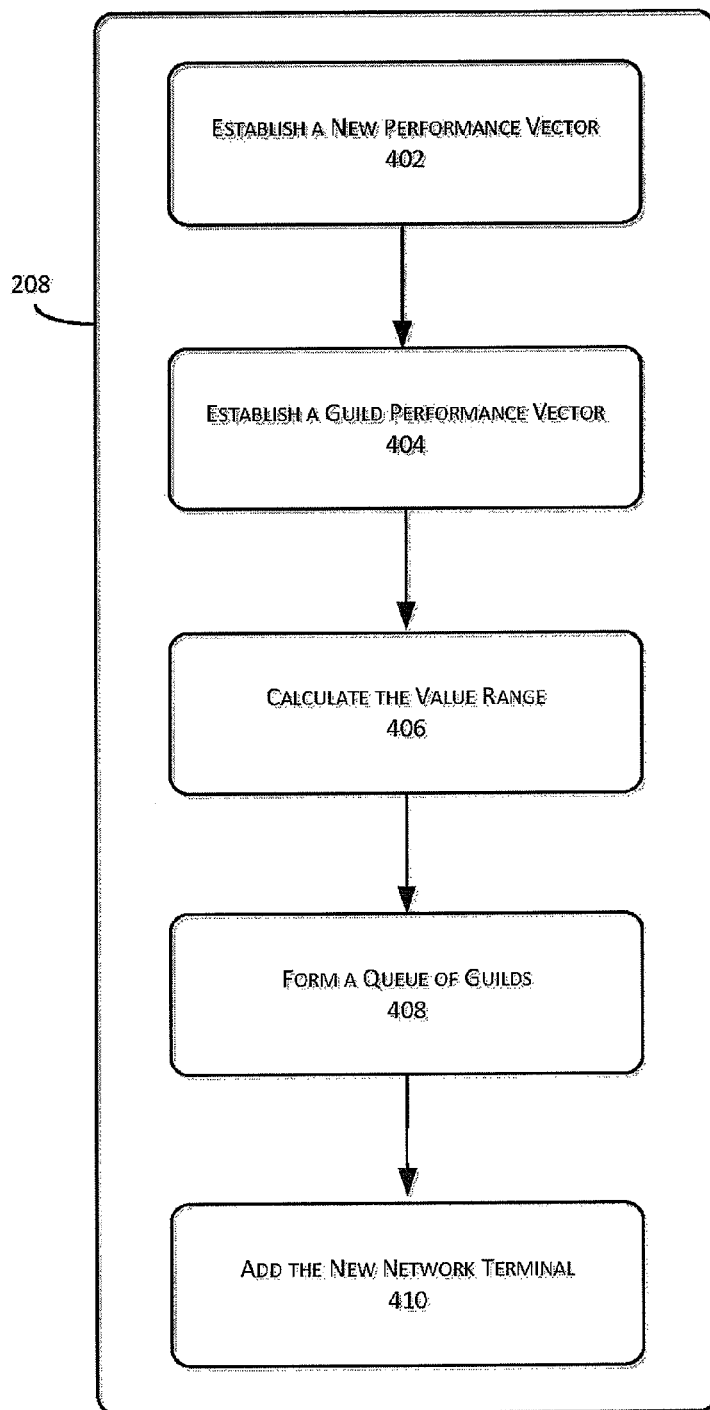
FIG. 4 shows an example configuration of another sub-processing flow of operations by which the formation of guilds in a cloud computing environment may be implemented.

FIG. 4 shows an example configuration of another sub-processing flow 400 of operations by which formation of guilds in a cloud computing environment may be implemented, arranged in accordance with at least some embodiments described herein. As depicted, sub-processing flow 400 may be included in block 208 (Add New Network Terminal to a Guild) described above with reference to FIG. 2. Further, sub-processing flow 400 may include sub-processes executed by various components that are part of example cloud computing system 100. However, sub-processing flow 400 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Sub-processing flow 400 may include various operations, functions, or actions as illustrated by one or more of blocks 402, 404, 406, 408, and 410. Sub-processing flow 400 may begin at block 402.

Block 402 (Establish a New Performance Vector) may refer to evaluator 103 establishing a new performance vector for a new network terminal after assessing the performance of the new network terminal. Similar to the performance vectors of each of network terminals 108, 110, 112, and 114, the new performance vector may also indicate a computational capability of the new network terminal. The new performance vector may be in the form of N: $(n_1, n_2, \ldots, n_i)$. Sub-processing flow 400 may continue from block 402 to 404.

Block 404 (Establish a Guild Performance Vector) may refer to evaluator 103 establishing a guild performance vector for each of guilds 106. Each guild performance vector, e.g., G: $(g_1, g_2, \ldots, g_i)$, may represent the average value of the performance vectors of network terminals within each guild, e.g., network terminals 108. The average value of vectors, e.g., $A_j$ $(a_{1j}, a_{2j}, \ldots, a_{ij})$, may be referenced as follows:

$$G:(g_1, g_2, \ldots, g_i) = \left( \frac{(a_{11} + a_{12} + \ldots + a_{1j})}{j}, \frac{(a_{21} + a_{22} + \ldots + a_{2j})}{j}, \ldots, \frac{(a_{i1} + a_{i2} + \ldots + a_{ij})}{j} \right).$$

Sub-processing flow 400 may continue from block 404 to 406.

Block 406 (Calculate the Value Range) may refer to evaluator 103 calculating the value range, i.e., the distance, between the new performance vector and the guild performance vector. The value range may be referenced as follows:

$$\sqrt{(n_1-g_1)^2+(n_2-g_2)^2+...+(n_i-g_i)^2}$$

Sub-processing flow 400 may continue from block 406 to 408.

Block 408 (Form a Queue of Guilds) may refer to allocator 102 sorting guilds 106 in a queue in ascending order of the calculated value range. Since the value range between vectors is not a vector, allocator 102 may be configured to sort the value ranges. Sub-processing flow 400 may continue from block 408 to 410.

Block 410 (Add the New Network Terminal) may refer to allocator 102 adding the new network terminal to the guild that is first in the queue so that the new network terminal may be clustered with other network terminals of similar performance.

Thus, FIG. 4 shows an example configuration of another sub-processing flow 400 of operations that include establishing a new performance vector for a new network terminal; establishing a guild performance vector for each of guild 106; calculating the value range between the new performance vector and the guild performance vector of each of guilds 106; forming a queue of guilds 106 based on respective ones of the calculated value ranges to the new performance vector, in ascending order; and adding the new network terminal to one of guilds 106 that is first in the queue.

Figure 5:
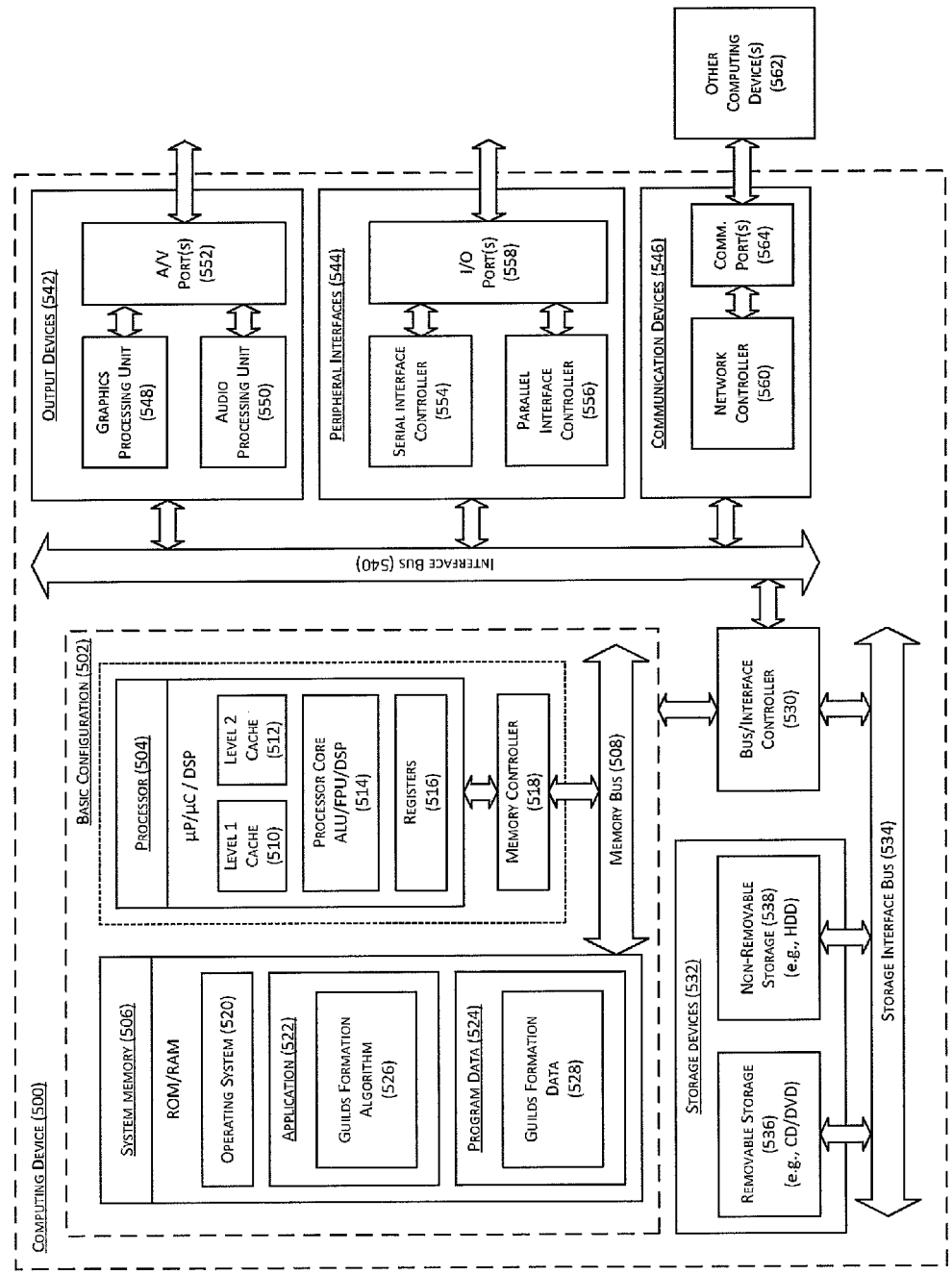
FIG. 5 shows a block diagram illustrating an example computing device that is arranged for the formation of guilds in a cloud computing environment, all arranged in accordance with at least some embodiments described herein.

FIG. 5 shows a block diagram illustrating an example computing device 500 that is arranged for formation of guilds in a cloud computing environment, arranged in accordance with at least some embodiments described herein.

In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522, e.g., allocator 102 that includes evaluator 103 and cluster component 104, may include a guilds formation algorithm 526 that is arranged to perform the functions as described herein including those described with respect to process 200, 300, and 400, e.g., generating performance vectors for network terminals 108. Program data 524 may include guilds formation data 528 that may be useful for configuring guilds formation algorithm 526 as is described herein. In some embodiments, application 522 may be arranged to operate with program data 524 on operating system 520 such that implementations of guilds formation may be provided as describe herein. Program data 524 may include elements of the performance vector of each of network terminals 108, 110, 112, and 114 and may further indicate a computational capability thereof. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method, comprising:
generating, for each of a plurality of network terminals, a performance vector that indicates a computational capability of a corresponding one of the plurality of network terminals;
forming a plurality of guilds by, for each of the guilds, clustering two or more of the plurality of network terminals, for which the respective performance vectors are within a predetermined threshold value range of each other, the predetermined threshold value range being modified dynamically according to the number of network terminals; and
allocating at least one of the plurality of guilds to a cloud server that provides executable contents to the plurality of network terminals.

2. The method of claim 1, wherein the generating comprises normalizing the performance vector.

3. The method of claim 1, wherein the performance vector includes at least one performance parameter including CPU speed, core numbers, or memory speed.

4. The method of claim 1, wherein the forming comprises limiting the number of network terminals in each of the plurality of guilds to a predetermined limit.

5. The method of claim 1, further comprising:
establishing a new performance vector for a new network terminal;
establishing a guild performance vector for each of the plurality of guilds;
calculating a value range between the new performance vector and the guild performance vector for each of the plurality of guilds;
forming a queue of the plurality of guilds based on each respective calculated value ranges to the new performance vector, in ascending order; and
adding the new network terminal to one of the plurality of existing guilds that is first in the queue.

6. The method of claim 4, wherein the allocating includes:
generating a current computational capability vector of the cloud server that indicates a maximum number of further network terminals that are allocable to the cloud server; and
allocating one of the plurality of guilds to the cloud server when the predetermined limit of the one of the plurality of guilds is less than the maximum number included in the current computation capability vector of the cloud server.

7. The method of claim 4, wherein the predetermined threshold value range and the predetermined limit are predetermined by a game provider.

8. The method of claim 4, wherein the predetermined limit is modified dynamically according to the number of network terminals.

9. A system, comprising:
a cloud server configured to provide executable contents to multiple network terminals, each of which is assigned a performance vector to indicate a corresponding computational capability; and one or more guilds, communicatively coupled to the cloud server, each including two or more of the multiple network terminals, for which the respective performance vectors are within a predetermined threshold value range of each other the predetermined threshold value range being modified dynamically according to the number of network terminals.

10. The system of claim 9, wherein the performance vectors of the network terminals within respective ones of the one or more guilds are within a predetermined threshold value range of each other.

11. The system of claim 9, wherein the performance vector includes at least one performance parameter including CPU speed, core number, or memory speed.

12. The system of claim 9, wherein the one or more guilds includes a number of multiple network terminals up to a predetermined limit.

13. The system of claim 12, further comprising a game provider, executable on the cloud server, configured to determine the predetermined threshold value range and the predetermined limit for each of the one or more guilds.

14. The system of claim 13, wherein the game provider is further configured to dynamically modify the predetermined limit for each of the one or more guilds according to number of the network terminals in each respective one of the one or more guilds.

15. A non-transitory computer-readable memory storing instructions that, when executed, cause one or more processors to perform operations comprising:

assigning each of a plurality of network terminals with a performance vector that indicates a computational capability of a corresponding network terminal;

forming a plurality of guilds by, for each of the guilds, clustering two or more of the plurality of network terminals based on the performance vectors of the two or more of the plurality of network terminals;

adding a new network terminal to one of a plurality of existing guilds; and allocating at least one of the plurality of guilds to a cloud server configured to provide executable contents to the plurality of network terminals.

16. The non-transitory computer-readable memory of claim 15, wherein the performance vector includes at least one performance parameters including CPU speed, core number, or memory speed.

17. The non-transitory computer-readable memory of claim 15, wherein the performance vectors of the two or more of the plurality of network terminals are within a predetermined threshold value range.

18. The non-transitory computer-readable memory of claim 15, wherein the operations further comprises normalizing the performance vector.

19. The non-transitory computer-readable memory of claim 15, wherein the operations further comprise:

establishing a new performance vector for the new network terminal;

calculating a guild performance vector for each of the plurality of existing guilds;

calculating a plurality of value ranges between the new performance vector and the guild performance vector for each of the plurality of existing guilds;

forming a queue of the plurality of existing guilds based on the plurality of value range values in an ascending order; and adding the new network terminal to one of the plurality of existing guilds that in the first place of the queue.

20. The non-transitory computer-readable memory of claim 17, wherein the operations further comprise limiting the number of network terminals in each of the plurality of guilds to a predetermined limit.

21. The non-transitory computer-readable memory of claim 18, wherein the operations further comprise:

generating a current computational capability vector of the cloud server that indicates a maximum number of further network terminals that can be allocated to the cloud server; and allocating at least one of the guild to the cloud server when the predetermined limit is less than the maximum number of future network terminals of the cloud server.

22. The non-transitory computer-readable memory of claim 18, wherein the operations further comprise determining the predetermined threshold value range and the predetermined limit.

23. The non-transitory computer-readable memory of claim 18, wherein the operations further comprise dynamically modifying at least one of the predetermined threshold value range and the predetermined limit according to the number of network terminals.

* * * * *

UNITED STATES PATENT AND TRADEMARK OFFICE
CERTIFICATE OF CORRECTION

PATENT NO. : 9,455,868 B2
APPLICATION NO. : 14/365324
DATED : September 27, 2016
INVENTOR(S) : Xu et al.

It is certified that error appears in the above-identified patent and that said Letters Patent is hereby corrected as shown below:

In the specification

In Column 1, Line 8, delete "§371" and insert -- § 371 --, therefor.

In Column 4, Line 24, delete "WIMAX™" and insert -- WiMAX™ --, therefor.

In Column 5, Line 2, delete "1108," and insert -- 110 B, --, therefor.

In Column 5, Line 5, delete "1148," and insert -- 114 B, --, therefor.

In Column 9, Line 4, delete " $\sqrt{(n_1 - g_1)^2 + (n_2 - g_2)^2 + \ldots + (n_i - g_i)^2}$ " and insert -- $\sqrt{(n_1 - g_1)^2 + (n_2 - g_2)^2 + \ldots + (n_i - g_i)^2}$ • --, therefor.

In the claims

In Column 14, Line 45, in Claim 5, delete "value ranges" and insert -- value range --, therefor.

Signed and Sealed this
Thirteenth Day of December, 2016

Michelle K. Lee
*Director of the United States Patent and Trademark Office*